United States Patent
Khan et al.

(10) Patent No.: US 11,294,576 B2
(45) Date of Patent: *Apr. 5, 2022

(54) OBJECT TRANSFORMATION IN A SOLID STATE DRIVE

(71) Applicant: Intel Corporation, Santa Clara, CA (US)

(72) Inventors: Jawad B. Khan, Portland, OR (US); Kelvin D. Green, Hillsboro, OR (US); Vasanthi Jagatha, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 16/506,628

(22) Filed: Jul. 9, 2019

(65) Prior Publication Data
US 2020/0012439 A1   Jan. 9, 2020

Related U.S. Application Data

(63) Continuation of application No. 15/391,758, filed on Dec. 27, 2016, now Pat. No. 10,353,604.

(51) Int. Cl.
*G06F 3/06* (2006.01)

(52) U.S. Cl.
CPC .......... *G06F 3/0619* (2013.01); *G06F 3/0643* (2013.01); *G06F 3/0679* (2013.01)

(58) Field of Classification Search
CPC ..... G06F 3/0619; G06F 3/0643; G06F 3/0679
See application file for complete search history.

(56) References Cited

U.S. PATENT DOCUMENTS

| | | | |
|---|---|---|---|
| 8,935,463 B1 | 1/2015 | Aswadhati et al. | |
| 9,619,167 B2 | 4/2017 | Khan et al. | |
| 2013/0142325 A1 | 6/2013 | Nagai et al. | |
| 2015/0032938 A1 | 1/2015 | Salessi | |
| 2015/0095663 A1* | 4/2015 | Seng | G06F 12/1408 713/193 |
| 2015/0143134 A1* | 5/2015 | Hashimoto | G06F 21/6209 713/193 |
| 2015/0149789 A1* | 5/2015 | Seo | G06F 3/0679 713/193 |
| 2015/0301763 A1 | 10/2015 | Shaharabany et al. | |
| 2016/0094619 A1* | 3/2016 | Khan | G06F 3/0658 709/203 |

(Continued)

OTHER PUBLICATIONS

Do, Jaeyoung et al., "Query Processing on Smart SSDs: Opportunities and Challenges", SIGMOD '13, Jun. 22-27, 2013, New York, New York, USA, 10 pages.

(Continued)

*Primary Examiner* — Ryan Bertram
(74) *Attorney, Agent, or Firm* — Compass IP Law PC

(57) ABSTRACT

A device transmits the capabilities of the device for performing transformations on offloaded objects, to a host. The device receives an object definition command from the host, where the object definition command indicates one or more transformations to apply to an object. One or more transformations are performed on the object to generate one or more transformed objects. A completion command is transmitted to the host to indicate completion of the one or more transformations on the object.

20 Claims, 10 Drawing Sheets

(56) References Cited

U.S. PATENT DOCUMENTS

2016/0378352 A1    12/2016   Khan et al.
2017/0147253 A1*    5/2017   Kawamura ........... G06F 3/0604
2017/0192718 A1     7/2017   Tsujimoto et al.

OTHER PUBLICATIONS

NVM Express, "NVM Express", Revision 1.2.1, Jun. 5, 2016, 217 pp.

Office Action for U.S. Appl. No. 15/391,758, dated Jun. 25, 2018, 8 pages.

* cited by examiner

FIG. 4

400 — Object definition command and Completion command

402 — Object definition command (transmitted by host)

| Transform N | En N | Start LBA N | Source Namespace |
|---|---|---|---|
| ••• | | | |
| Transform 3 | En 3 | Start LBA 3 | Source Namespace |
| Transform 2 | En 2 | Start LBA 2 | Source Namespace |
| Transform 1 | En 1 | Start LBA 1 | Source Namespace |
| Original Object | En 0 | Start LBA 0 | Source Namespace |

| 408 — PRP List | |
|---|---|
| Object Size (LBA) | Object Size (Bytes) |

| Object Type | CMD ID | Opcode |
|---|---|---|

404 — Completion command (transmitted by SSD)

| CMD ID | |
|---|---|
| Vendor Specific Status code = additional completion information is available via Get Log command | Log Ptr |

406 — Completion log (transmitted by SSD)

| CMD ID | | | | | |
|---|---|---|---|---|---|
| Transform N | En N | Start LBA N | Size N (Bytes) | Dest Namespace | Status N |
| ••• | | | | | |
| Transform 2 | En 2 | Start LBA 2 | Size 2 (Bytes) | Dest Namespace | Status 2 |
| Transform 1 | En 1 | Start LBA 1 | Size 1 (Bytes) | Dest Namespace | Status 1 |
| Original Object | | Start LBA | Size | Dest Namespace | Status |

OBJECT TRANSFORMATION IN A SOLID STATE DRIVE

RELATED CASE

This application is a continuation of U.S. patent application Ser. No. 15/391,758 filed Dec. 27, 2016, entitled "OBJECT TRANSFORMATION IN A SOLID STATE DRIVE". The entire Specification of which is hereby incorporation herein by reference in its entirety.

BACKGROUND

A solid state drive (SSD) is a data storage device that uses integrated circuit assemblies as non-volatile memory to store data persistently. The SSD may be coupled to a host computing system, such as a personal computer or a server, where the host computing system performs input/output (I/O) operations on the SSD, and where the I/O operations may include writing data to the SSD and reading data from the SSD.

BRIEF DESCRIPTION OF THE DRAWINGS

Referring now to the drawings in which like reference numbers represent corresponding parts throughout:

FIG. 4 illustrates a block diagram on an object definition command transmitted from the host to the SSD, and a completion command and a log transmitted from the SSD to the host, in accordance with certain embodiments;

DETAILED DESCRIPTION

In the following description, reference is made to the accompanying drawings which form a part hereof and which illustrate several embodiments. It is understood that other embodiments may be utilized and structural and operational changes may be made.

Certain embodiments provide a mechanism for offloading the task of performing transformations on objects, from a host to a SSD, where the objects may comprise any suitable representation of data. The objects may be stored in locations in memory and data values may be assigned to the locations in memory. An object may be a uniquely identifiable piece of data, where the data has a specific format or meaning to the host and the SSD. For example, an image object may describe an image in a format, such as, JPEG, GIF, PNG etc. Other examples of an object may include an audio object, a video object, or even an arbitrary object with a special meaning for the host, where the object may be transformed by the SSD. The objects may be of an arbitrary size. The objects may also be referred to as data objects.

The SSD has the capability of applying a set of transformations to incoming objects from a host. The host discovers the object transformation capabilities of the SSD and then issues commands to the SSD, where the commands may specify the objects and the transformations to apply to the objects. The original data as well as the transformed output are then stored in the SSD. Optionally, the intermediate transformations of the original data may also be stored in the SSD. The SSD frees up valuable processing cycles on the host, as the SSD has the capability to apply appropriate transformations based on the object type. This may be particularly useful in low latency applications that require hardware acceleration and storage.

Figure 1:
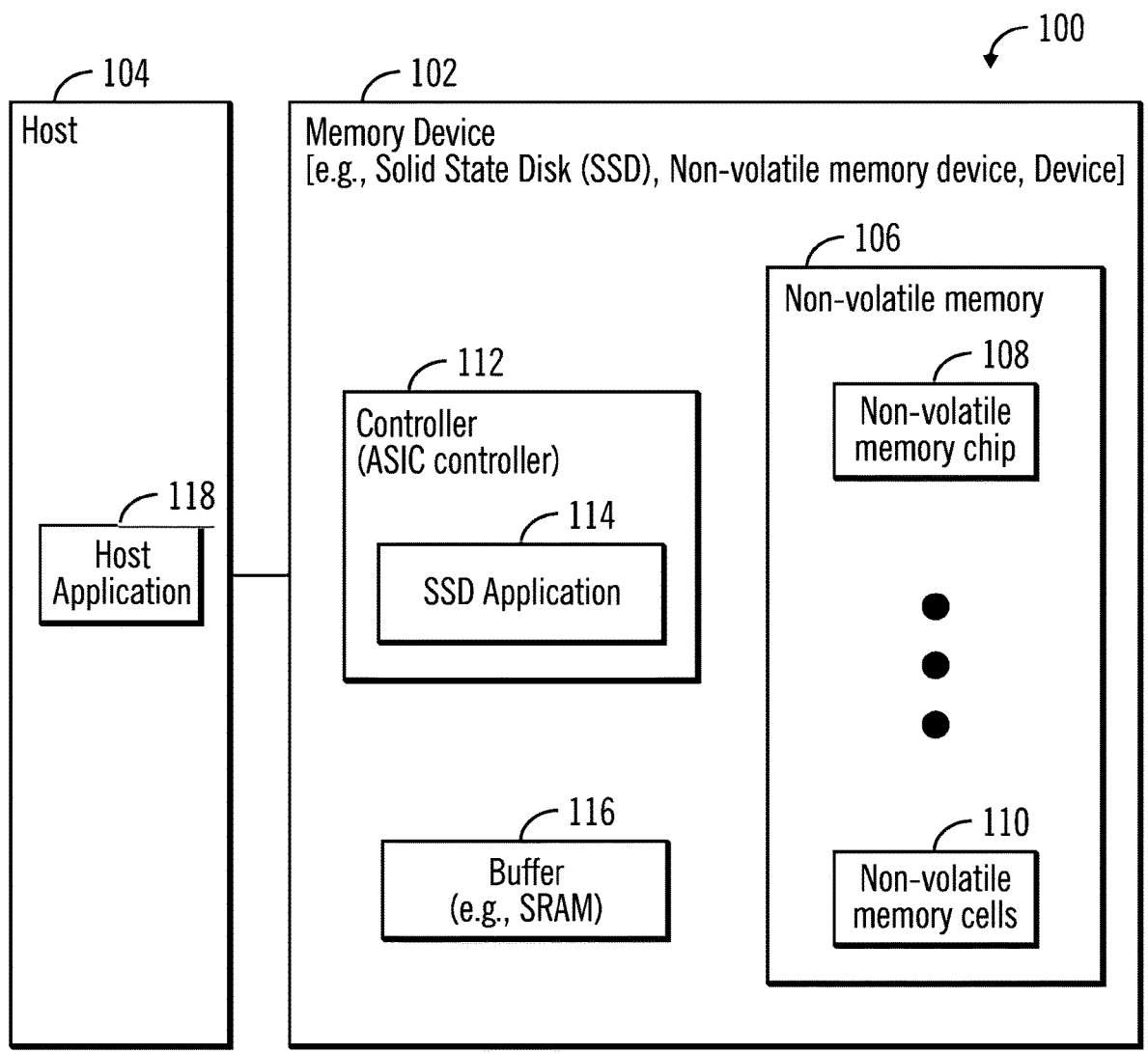
FIG. 1 illustrates a diagram that shows a memory device, such as a SSD, that is coupled to a host, in accordance with certain embodiments.

FIG. 1 illustrates a diagram 100 that shows a memory device 102, such as a SSD, that is coupled to a host 104, in accordance with certain embodiments.

The memory device 102 may comprise a memory board, a SSD, or any other device that includes non-volatile memory 106. In certain embodiments, the non-volatile memory 106 may be comprised of a plurality of non-volatile memory chips 108, 110. Other configurations of the memory device 102 are possible in alternative embodiments, as long as the memory device 102 includes the non-volatile memory 106.

Although various embodiments are described with respect to a SSD 102, embodiments may be applied to any memory device that comprise non-volatile memory. In one embodiment, the memory device is a block addressable memory device, such as those based on NAND or NOR technologies. A memory device may also include future generation non-volatile devices, such as a three dimensional crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), magnetoresistive random access memory (MRAM) memory that incorporates memristor technology, or spin transfer torque (STT)-MRAM, a spintronic magnetic junction memory based device, or a combination of any of the above, or other memory. The memory device may refer to the die itself and/or to a packaged memory product.

In certain embodiments, the host 104 may be a computational device (e.g., a laptop computer, a desktop computer, a tablet, a cell phone, a processor, a server, a disk array, or any other suitable computational device), and the memory device 102 may be included inside or may be located outside the host 104. While FIG. 1 shows the memory device 102 to be located outside the host 104, in certain embodiments, the memory device 102 may be included within the host 104. In certain embodiments, the host 104 may communicate with the memory device 102 over a bus (such as a Peripheral Component Interconnect (PCIe), Serial Advanced Technology Attachment (SATA), Serial Attached Small Computer System Interface (SAS)), or a network, such as the Internet, a storage area network (SAN), a local area network (LAN), etc., or a logical device interface, such as NVM Express (NVMe) (www.nvmexpress.org).

The memory device 102 may include a controller 112, where the controller 112 may be implemented via an application-specific integrated circuit (ASIC). The controller 112 may include an SSD application 114 that controls the process of performing transformation on objects. In certain embodiments, the SSD application 114 may be implemented in hardware, firmware, software or any combination thereof, and the SSD application 114 may communicate with a host application 118 that executes in the host 104.

The memory device 102 may include a buffer 116 that is comprised of volatile memory, such as a static random access memory (SRAM). The buffer 116 may be used by the SSD application 114 to initially store objects that are received or retrieved from the host 104. The buffer 116 may also temporarily hold intermediate and final results while performing transformations on the objects.

Figure 2:
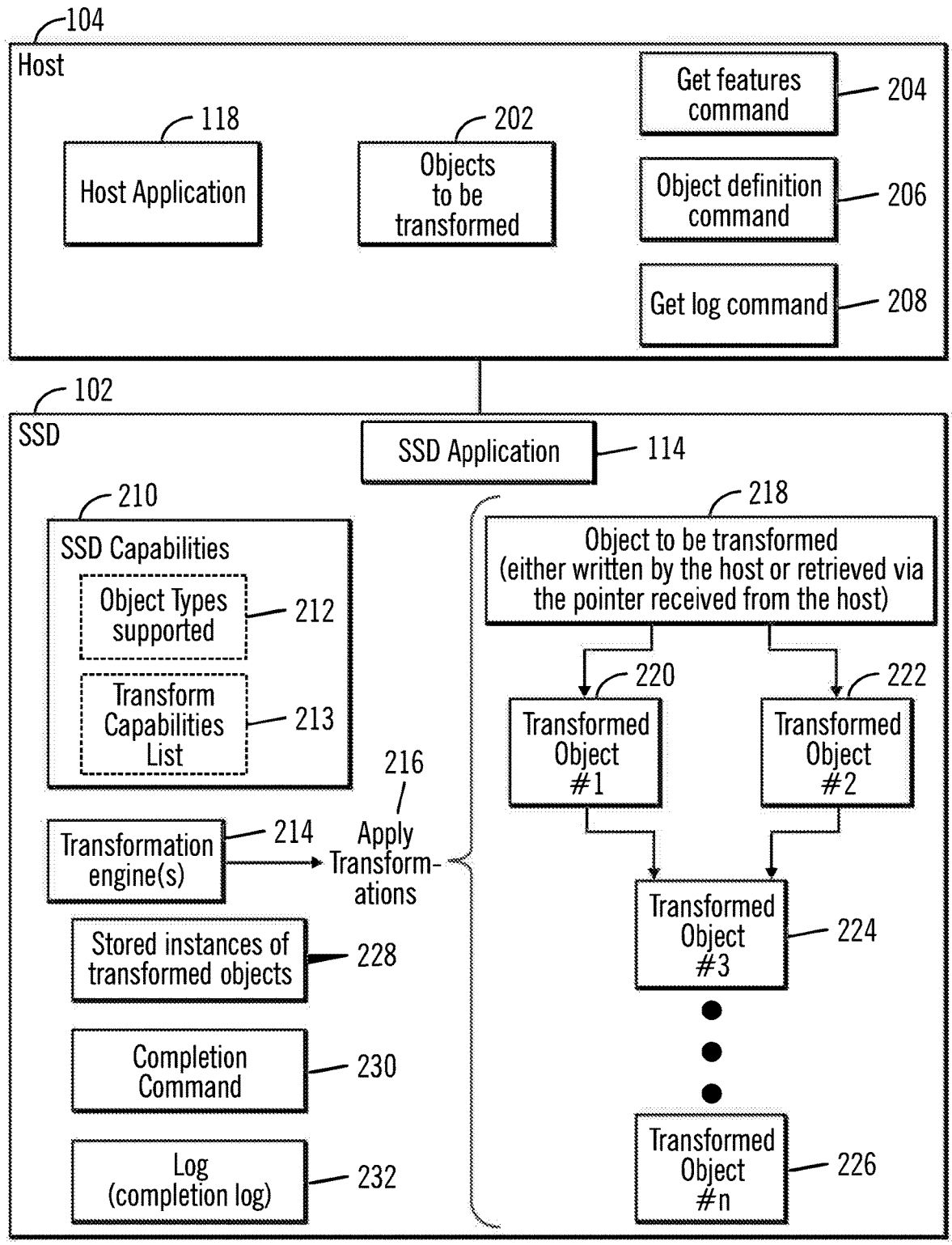
FIG. 2 illustrates a diagram that shows applications and data structures implemented in a memory device and a host, in accordance with certain embodiments.

FIG. 2 illustrates a diagram that shows applications and data structures implemented in the memory device 102 and the host 104, in accordance with certain embodiments.

In addition to the host application 118, the host 104 initially stores in memory the objects to be transformed (shown via reference numeral 202), and a "get features" command 204 that determines the object transformation capabilities of the SSD 102. The host 104 also stores an object definition command 206 that the host 104 may transmit to the SSD 102 to communicate at least the object transformations to apply on objects offloaded to the SSD 102 from the host 104. The host 104 also includes a "get log" command 208 that may be sent to the SSD 102 to determine the locations at which the SSD 102 stores the transformed objects.

In addition to the SSD application 114, the SSD 102 also stores data structures that indicate the SSD capabilities 210. The SSD capabilities 210 may include the object types supported by the SSD (reference numeral 212) and the transform capabilities 213 of the SSD 102.

The SSD 102 includes a plurality of transformation engines 214 that are configurable to apply transforms to perform transformations on the object 218, where the object 218 is either written by the host 104 to the SSD 102, or is retrieved by the SSD 102 from the host 104 via a pointer received from the host 104 in the object definition command 206. The object 218 may be transformed into one or more transformed objects in a sequence 220, 222, 224, 226, where object 218 was received or retrieved form the host 104 and where the object 218 may correspond to the object 202. The transformation engines 214 may perform many different types of transformations such as encryption, various image processing operations, deduplication, extraction of information, or any other processing operations.

The SSD 102 may maintain stored instances of transformed objects 228 in the non-volatile memory 106. A completion command 230 that indicates completion of the transformations of the object 218 to the host 104 may also be included in the SSD 102. A log 232 that stores the location of the transformed objects may also be stored in the SSD 102.

Figure 3:
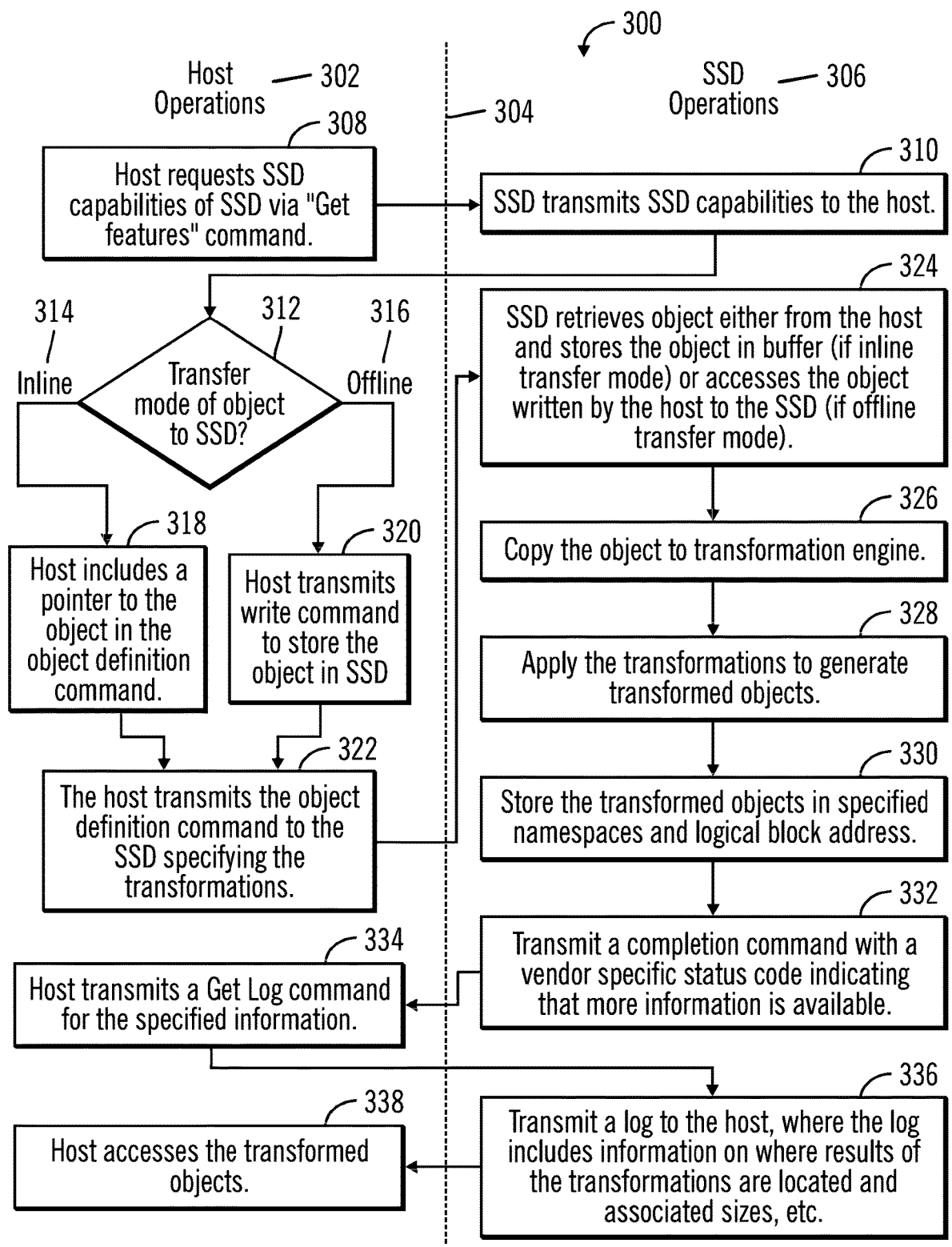
FIG. 3 illustrates a flowchart that shows the offloading of transformations on an object from the host to the SSD, in accordance with certain embodiments.

FIG. 3 illustrates a flowchart 300 that shows the offloading of transformations on an object from the host 104 to the SSD 102, in accordance with certain embodiments. The host operations 302 are shown to the left of the dashed line 304, and the SSD operations 306 are shown to the right of the dashed line 304.

Control starts at block 304 in which the host 104 requests the SSD capabilities 210 of the SSD 102 via the "get features" command 204. Control proceeds to block 310 in which the SSD 102 transmits the SSD capabilities 210 to the host 104. The host 104 determines (at block 312) the transfer mode of objects to the SSD 102. If the transfer mode is an inline mode 314, then control proceeds to block 318 in which the host 104 includes a pointer to the object in the object definition command 206. If the transfer mode is an offline mode 316 then the host 104 transmits (at block 320) a write command to the SSD 102 to store the object in the SSD 102.

From blocks 318 and 320 control proceeds to block 322 in which the host 104 transmits the object definition command 206 to the SSD 102, where the object definition command 206 includes the transformations to be performed on the objects that are offloaded to the SSD 102.

From block 322 control proceeds to block 324 in which the SSD 102 retrieves the object either from the host 104 and stores or streams the object in buffer 116 (if inline transfer mode) or accesses the object written by the host 104 to the SSD 102 (if offline transfer mode). The SSD 102 copies (at block 326) the object to the transformation engines 214, and applies the transformations to generate transformed objects (at block 328). Control proceeds to block 330 in which the SSD 102 stores the transformed objects, and then the SSD 102 transmits (at block 332) a completion command 230 with a vendor specific status code to the SSD 102 to indicate that more information is available. In certain embodiments, at block 332, the location of the transformed objects (i.e., the location where the results of the transformations are stored) is transmitted in association with the completion command, instead of or in addition to the vendor specific status code. In certain other embodiments, at block 332, additional information such as the size of the transformed objects may also be transmitted in association with the completion command.

From block 332 control may proceed to block 334 in which the host 104 transmits a get log command 208 for the specified information. The SSD 102 transmits a log 232 to the host 104, where the log 232 includes information on where the results of the transformations are stored, and the associated sizes of the transformed objects. The host 104 may then access (at block 338) the transformed objects. In certain embodiments in which the host 104 secures the location of the transformed objects in association with the completion command sent from the SSD 102 at block 332, the performing of the operations shown at blocks 334 and 336 may be avoided.

FIG. 4 illustrates a block diagram 400 of an object definition command 402 transmitted from the host 104 to the SSD 102, and a completion command 404, and a completion log 406 transmitted from the SSD 102 to the host 104, in accordance with certain embodiments. It should be noted that the object definition command 402, the completion command 404, and the completion log 406 may be implemented differently in different embodiments.

The object definition command 402 is an exemplary vendor specific object definition command that may store up to "N" transforms for a specific object type. The PRP list field 408 that includes a pointer to the original object in the host 104 is used in the inline mode (i.e., streaming mode) because the original object needs to be transferred from the host 104 to the SSD 102. In embodiments where the NVMe protocol is used, the object definition command 402 may be defined as a vendor unique command. Further details of the NVMe protocol may be found in the publication, "NVM Express: Revision 1.2.1, published by NVM Express, Inc., on Jun. 5, 2016. Other protocols besides the NVMe may be used in other embodiments.

Various fields of the object definition command 402 are described below:
(1) Opcode: Opcode for Object definition command;
(2) CMD ID: Command identifier (ID);
(3) Object Type: One of the object types defined for the SSD;
(4) Object Size: Size of object in number of logical block addresses (LBA) and bytes;
(5) Original Object: unique ID representing original data object that is enabled only in "inline" mode;
(6) Transform#: Unique ID for a transform of a particular object defined for the SSD;
(7) EN#: Flags that inform the SSD to store original data or transform results;
(8) PRP list: Pointer to list of host memory address locations where the original data is present;
(9) Start LBA#: Starting LBA locations for the transforms and object;
(10) NS#: Namespace ID where the original data or transforms are to be stored;

The fields of the completion command 404 may also be incorporated into an NVMe completion command. The various fields of the completion command 404 are as follows:
(1) CMD ID: Command identifier;
(2) Log Ptr: Address pointer to completion log location (The host 104 may access this log to discover where the transformation results are stored).

The generic format of a completion log 406 specified by the completion command 404 is shown via reference numeral 406. The completion log 406 contains the size, namespace, starting LBA of the object and its transforms (i.e., transformations). If a particular transform is not enabled, then the corresponding fields are considered invalid.

In certain embodiments, the results of the transformations are sent from the SSD 102 to the host 104 through an NVMe command completion which indicates success or failure. The command completion has a pointer to a completion log 406 that indicates the success or failure of the different transformation results. The command completion also contains a set of LBAs in which the transformed object is stored on the SSD and the size of the transformed object. The host 104 may allocate an LBA range for storing the results of the transformations. The SSD 102 manages the allocated LBA range. In certain embodiments, a circular buffer contains the results of the transformations and it may be up to the host 104 to ensure that an overwrite does not occur once the circular buffer is full, and also to move the objects to a different location by using local copy commands. A linear buffer may also be used, in which case the SSD 102 may stop processing further commands if the allocated linear buffer is full and may indicate to the host 104 that there is no more space left for storing the transformed data. Optionally, the host 104 may specify a particular namespace that is to be used for stored transformed objects. In this approach, the host writes objects to namespace X and configures the controller 112 to write the transformed objects to namespace Y. The controller 112 may manages the LBA space of namespace Y, and may provide the LBA offset and the size of the transformed object to the host 104 via the completion command 404.

Figure 5:
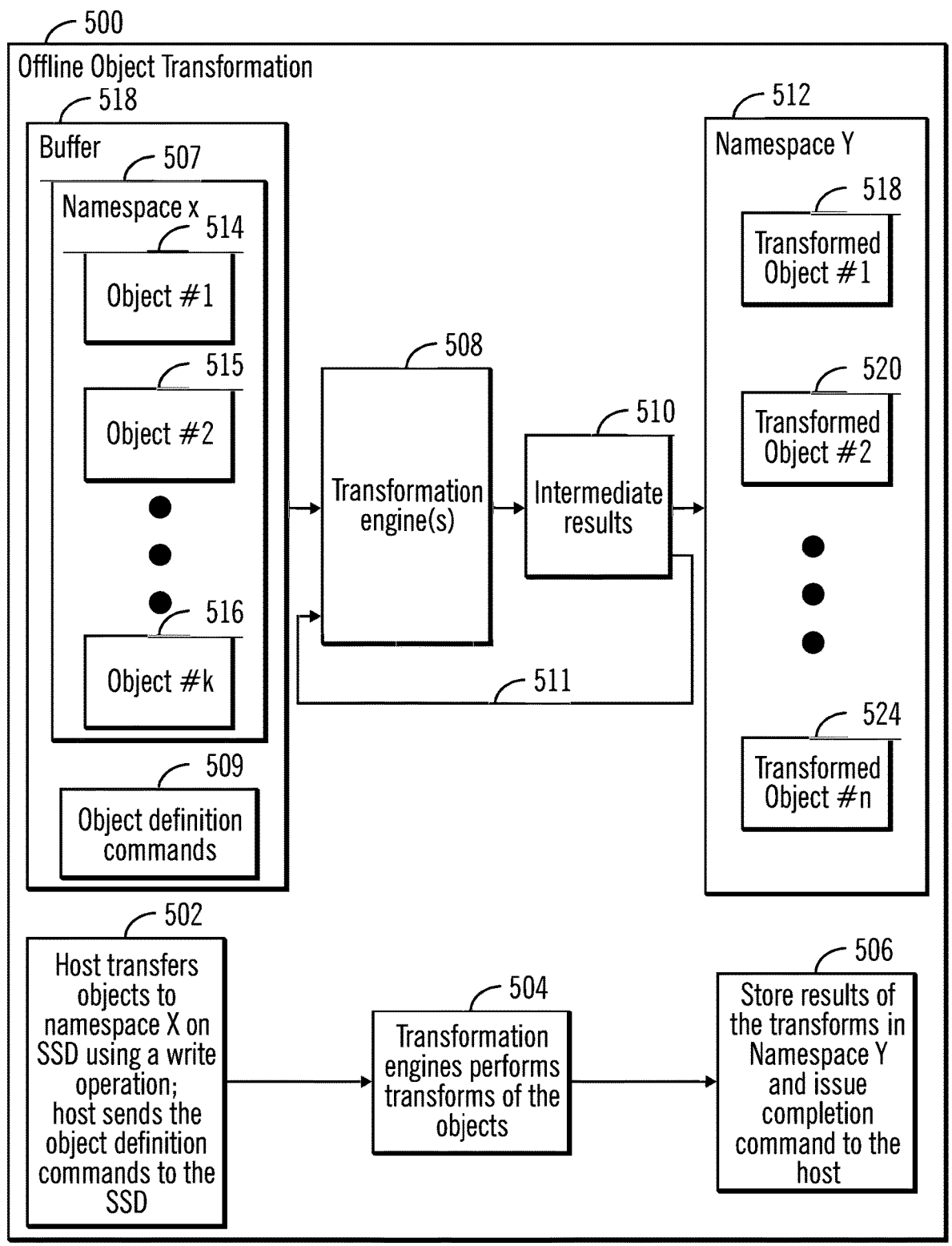
FIG. 5 illustrates a diagram that shows the offline transformation of objects, in accordance with certain embodiments.

FIG. 5 illustrates a diagram 500 that shows the offline transformation of objects, in accordance with certain embodiments. Control starts at block 504 in which the host 104 transfers objects to namespace X 507 on the SSD 102 by using a write operation and transmits the object definition commands to the SSD 102. The transformation engines 508 perform (at block 504) transforms of the objects 514, 515, 516 and may generate intermediate results 510 during the process. A feedback loop 511 shows the process of generating the transforms of the objects 514, 515, 516, with the transformation engines 508 iteratively processing a previous set of intermediate results to generate a next set of intermediate results. The transformation engines 508 stores (at block 506) the results of the transformations in Namespace Y 512 and the SSD 102 issues completion command to the host 104.

The objects 514, 515, 516 of Namespace X 507 are stored in the buffer 518, whereas the transformed objects 518, 520, 524 may be stored in the non-volatile memory 106 of the SSD 102. The object definition commands 509 are also stored in the buffer 518.

Figure 6:
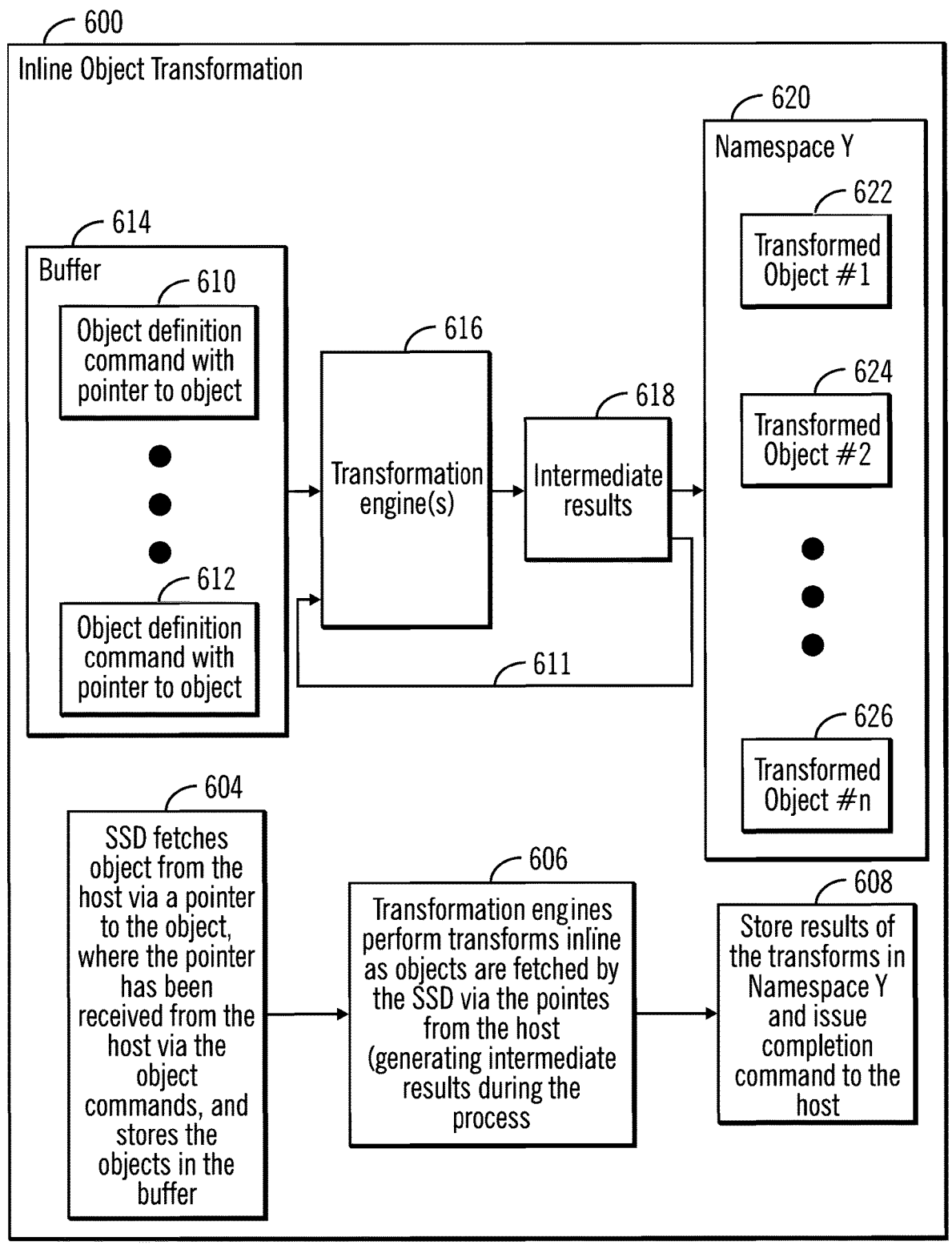
FIG. 6 illustrates a diagram that shows the inline transformation of objects, in accordance with certain embodiments.

FIG. 6 illustrates a diagram 600 that shows the inline transformation of objects, in accordance with certain embodiments.

Control starts at block 604 in which the SSD 102 fetches an object from the host 104 via a pointer to the object, where the pointer has been received from the host 104 via the object definition commands 610, 612, and stores the objects in the buffer 614. The transformation engines 616 perform transforms (at block 606) inline (in a streaming mode) as objects may be fetched by the SSD 102 in a streaming mode via the pointers from the host 104, and generate intermediate results 618 during the process. A feedback loop 611 shows the process of generating the transformations of the object, with the transformation engines 616 iteratively processing a previous set of intermediate results to generate a next set of intermediate results.

The transformation engines 616 store (at block 608) the results of the transformations in Namespace Y 620 as transformed objects 622, 624, 626 and the SSD 102 issues a completion command 230 to the host 104.

Figure 7:
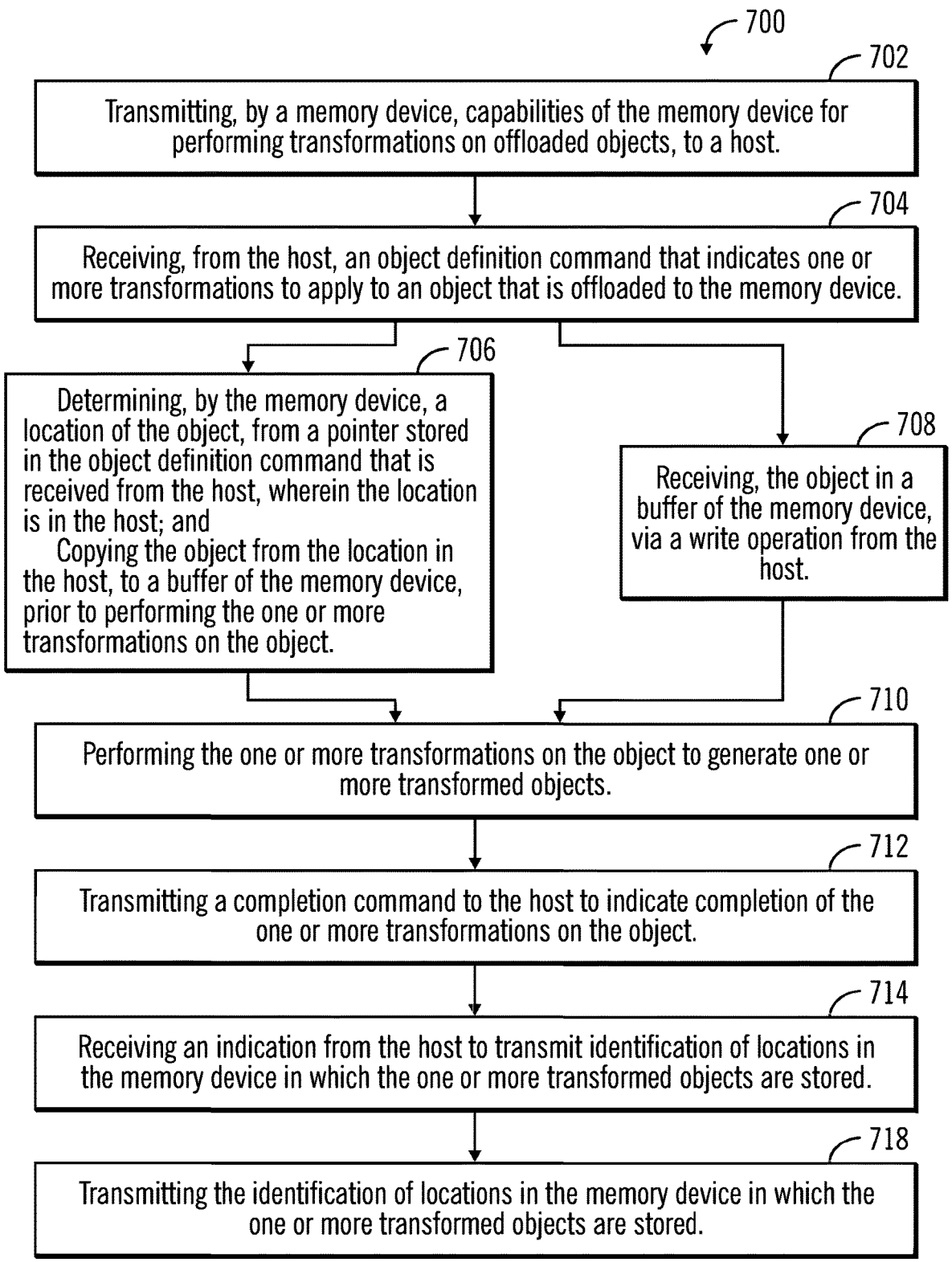
FIG. 7 illustrates a flowchart that shows object transformation in a SSD, in accordance with certain embodiments.

FIG. 7 illustrates a flowchart that shows object transformation in a SSD 102, in accordance with certain embodiments. The operations shown in FIG. 7 may be performed by the controller 112 of the SSD 102.

Control starts at block 702 in which a memory device 102 transmits the capabilities of the memory device 102 for performing transformations on offloaded objects, to a host 104. The memory device 102 receives (at block 704) an object definition command from the host 104, where the object definition command indicates one or more transformations to apply to an object that is offloaded to the memory device 102.

From block 704 control may proceed to either block 706 or block 708. In block 706, the memory device 102 determines a location of the object, from a pointer stored in the object definition command that is received from the host 104, where the location is in the host 104. The object is copied from the location in the host, to a buffer of the memory device, prior to performing the one or more transformations on the object. In block 708, the object is received in the buffer of the memory device, via a write operation from the host.

From blocks 706 and 708 control proceeds to block 710 in which one or more transformations are performed on the object to generate one or more transformed objects. A completion command is transmitted (at block 712) to the host 104 to indicate completion of the one or more transformations on the object. An indication is received (at block 714) from the host 104 to transmit identification of locations in the memory device 102 in which the one or more transformed objects are stored. The identification of locations in the memory device 102 in which the one or more transformed objects are stored are transmitted (at block 716) by the memory device 102 to the host 104.

Therefore, FIGS. 1-7 illustrate certain embodiments for offloading object transformations to a memory device 102 from a host 104, to reduce the usage of processing cycles in the host 104.

Figure 8:
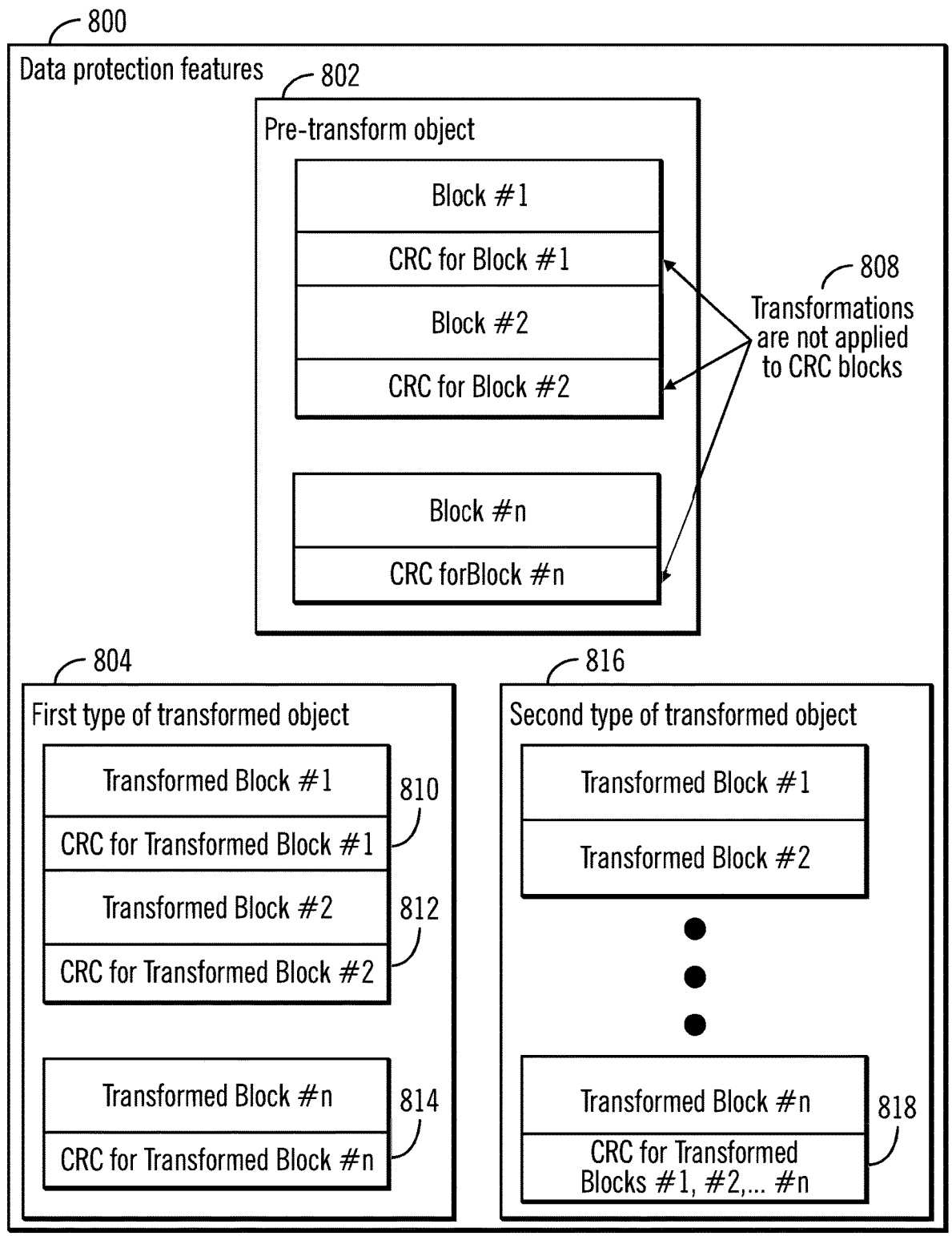
FIG. 8 illustrates a block diagram that shows how data is protected during object transformation, in accordance with certain embodiments.

FIG. 8 illustrates a block diagram 108 that how data is protected during object transformations, in accordance with certain embodiments. The original object (i.e., the pre-transform object 802) may have data integrity maintaining features, such as cyclic redundancy code (CRC) stored after each block. The transformations by the transformation engine of the SSD 102 are not applied to the CRC blocks (as shown via reference numeral 808).

In a first type of transformed object 804, each transformed block has a new CRC code calculated for the transformed block as shown via reference numerals 810, 812, 814. In a second type of transformed object 816, a single CRC code 818 is calculated for a plurality of transformed blocks. Other embodiments may ensure data integrity during transformations via other mechanisms besides CRC. For example, in alternative embodiments checksums may be used for ensuring data integrity.

Therefore, FIG. 8 illustrates certain embodiments in which the integrity of the object that is received and the one or more transformed objects are maintained via an error detection and correction mechanism.

Figure 9:
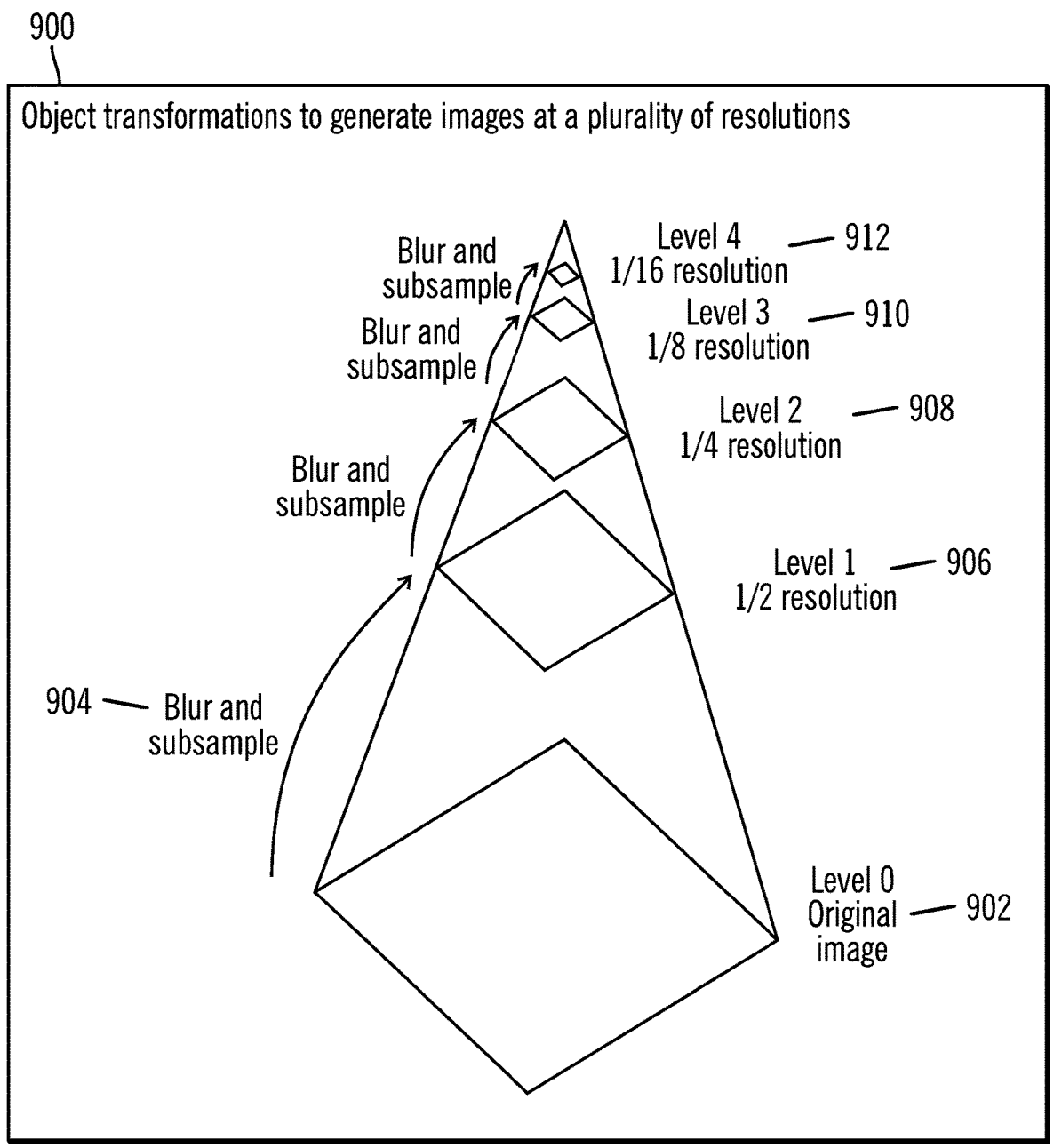
FIG. 9 illustrates a block diagram that shows how object transformations are performed to generate images at a plurality of resolutions, in accordance with certain embodiments.

FIG. 9 illustrates a block diagram 900 that how object transformations are performed to generate images at a plurality of resolutions, in accordance with certain embodiments. An original image 902 may be transformed in the memory device 102 into a plurality of images at a plurality of resolutions via blurring and subsampling 904 or via other mechanisms. The transformed images are shown via reference numerals 906, 908, 910, 912. The performing of the blurring and sub sampling operations are offloaded to the SSD 102 from the host 104.

Therefore, FIG. 9 illustrates certain embodiments in which transformed objects comprise a plurality of images at a plurality of resolutions.

The described components and/or operations may be implemented as a method, apparatus or computer program product using standard programming and/or engineering techniques to produce software, firmware, hardware, or any combination thereof. The described operations may be implemented as code maintained in a "computer readable storage medium" for implementation in certain embodiments or for software simulation of a memory chip for design purposes, where a processor may read and execute the code from the computer storage readable medium. The computer readable storage medium includes at least one of electronic circuitry, storage materials, inorganic materials, organic materials, biological materials, a casing, a housing, a coating, and hardware. A computer readable storage medium may comprise, but is not limited to, a magnetic storage medium (e.g., hard drive drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmission signals. Those skilled in the art will recognize that many modifications may be made to this configuration, and that the article of manufacture may comprise suitable information bearing medium known in the art.

Computer program code for carrying out operations for aspects of the certain embodiments may be written in any combination of one or more programming languages. Blocks of flowcharts and/or block diagrams may be implemented by computer program instructions.

Figure 10:
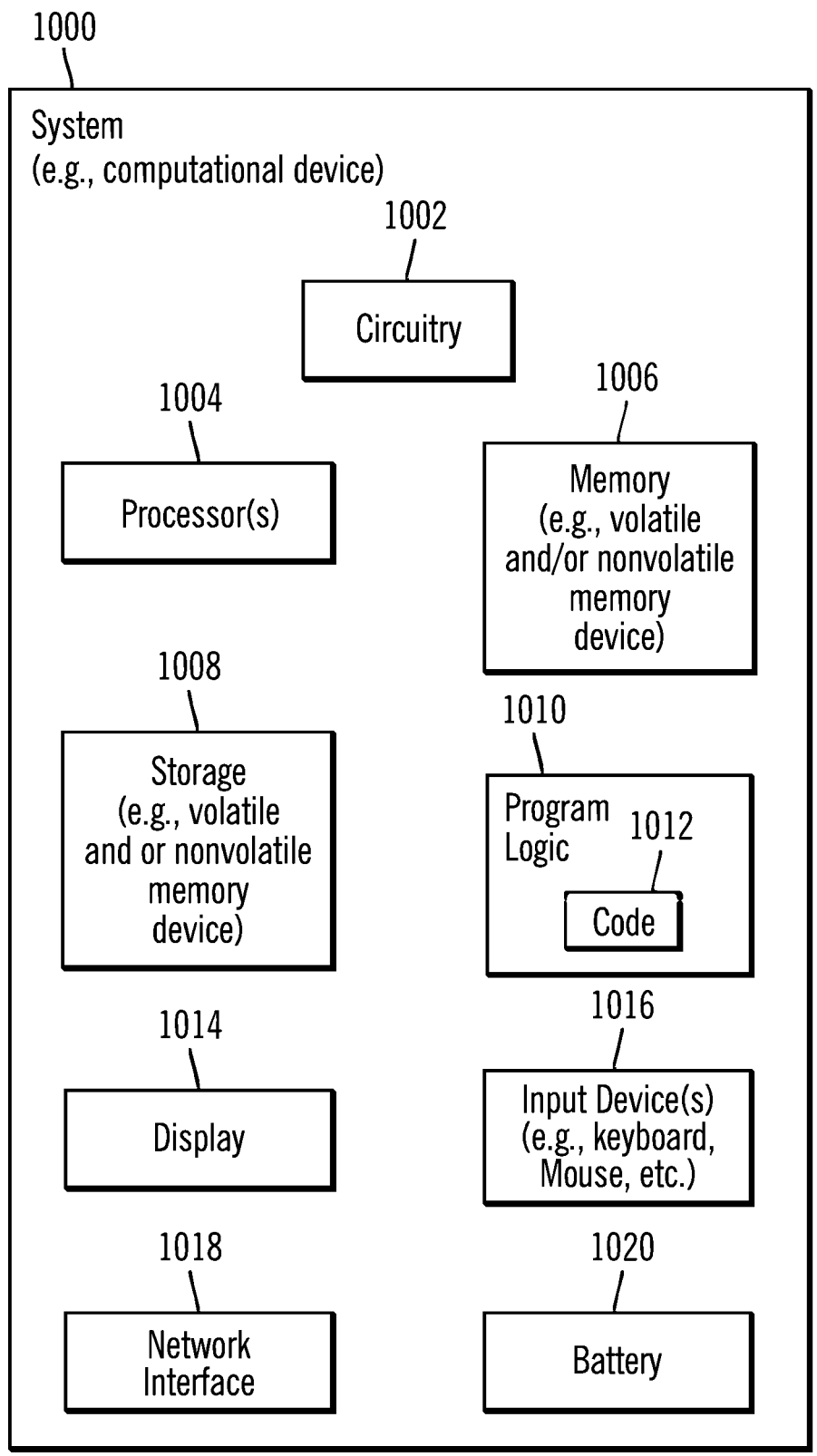
FIG. 10 illustrates a block diagram of a system including a computational device that includes a memory device comprised of non-volatile memory, in accordance with certain embodiments.

FIG. 10 illustrates a block diagram of a system 1000 that may include a computational device where a memory device (designed as per the architecture of the memory device 102 shown in FIG. 1) is included in the computational device. For example, in certain embodiments the system 1000 may be a computer (e.g., a laptop computer, a desktop computer, a tablet, a cell phone or any other suitable computational device) that has a memory device (designed as per the architecture of memory device 102 shown in FIG. 1) in the computer. The system 1000 may include a circuitry 1002 that may in certain embodiments include at least a processor 1004. The system 1000 may also include a memory 1006 (e.g., a memory device 102 as per the architecture shown in FIG. 1), and storage 1008 (e.g., e.g., a memory device 102 as per the architecture shown in FIG. 1). The storage 1008 may include a solid state drive, a disk drive, or other drives or devices including a non-volatile memory device (e.g., EEPROM, ROM, PROM, flash, firmware, programmable logic, etc.). The storage 1008 may also include a magnetic disk drive, an optical disk drive, a tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. Therefore, while FIG. 10 shows the program logic 1010 separately from the other elements, the program logic 1010 may be implemented in the memory 1006 and/or the circuitry 1002. The system 1000 may also include a display 1014 (e.g., an liquid crystal display (LCD), a light emitting diode (LED) display, a cathode ray tube (CRT) display, a touchscreen display, or any other suitable display). The system 1000 may also include one or more input devices 1016, such as, a keyboard, a mouse, a joystick, a trackpad, or any other suitable input devices. In certain embodiments, the display 1014 may be coupled to a memory device comprising the storage 1008 and/or the memory 1006; a network interface 1018 may be communicatively coupled to the processor 1004; and a battery 1020 may be communicatively coupled to the processor 1004. Other components or devices beyond those shown in FIG. 10 may also be found in the system 1000.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to be limited to the precise forms disclosed. Many modifications and variations are possible in light of the above teaching.

EXAMPLES

The following examples pertain to further embodiments.

Example 1 is a method for object transformation, in which a memory device transmits capabilities of the memory device for performing transformations on offloaded objects, to a host. The memory device receives, from the host, an object definition command that indicates one or more transformations to apply to an object. One or more transformations are performed on the object to generate one or more transformed objects. A completion command is transmitted to the host to indicate completion of the one or more transformations on the object.

In example 2, the subject matter of example 1 may include that a determination is made by the memory device, of a location of the object, from a pointer stored in the object definition command that is received from the host, wherein the location is in the host. The object is copied from the location in the host, to a buffer of the memory device, prior to performing the one or more transformations on the object.

In example 3, the subject matter of example 1 may include that the object is received in a buffer of the memory device, via a write operation from the host, prior to performing the one or more transformations on the object.

In example 4, the subject matter of example 1 may include that the one or more transformed objects are stored in the memory device in one or more namespaces and logical block addresses identified by the object definition command.

In example 5, the subject matter of example 1 may include that the object definition command indicates to the memory device whether successive transformations are to be applied to the object, and whether intermediate objects generated via the successive transformations are to be stored in the memory device for retrieval by the host.

In example 6, the subject matter of example 1 may include that the method further comprises: in response to transmitting the completion command to the host, receiving an indication from the host to transmit identification of locations in the memory device in which the one or more transformed objects are stored; and in response to receiving the indication from the host, transmitting the identification of locations in the memory device in which the one or more transformed objects are stored.

In example 7, the subject matter of example 1 may include that the integrity of the object that is received and the one or more transformed objects is maintained via an error detection and correction mechanism.

In example 8, the subject matter of example 1 may include that a location of the one or more transformed objects is transmitted in association with the completion command.

Example 9 is a device for object transformation, wherein the devices comprises: a non-volatile memory; and a controller coupled to the non-volatile memory, wherein the controller is configurable to: transmit capabilities of the device for performing transformations on offloaded objects, to a host; receive, from the host, an object definition command that indicates one or more transformations to apply to an object; perform the one or more transformations on the object to generate one or more transformed objects; and transmit a completion command to the host to indicate completion of the one or more transformations on the object.

In example 10, the subject matter of example 9 may include that the controller is further configurable to: determine a location of the object, from a pointer stored in the object definition command that is received from the host, wherein the location is in the host; and copy the object from the location in the host, to a buffer of the device, prior to performing the one or more transformations on the object.

In example 11, the subject matter of example 9 may include that the controller is further configurable to: receive the object in a buffer of the device, via a write operation from the host, prior to performing the one or more transformations on the object.

In example 12, the subject matter of example 9 may include that the one or more transformed objects are stored in the device in one or more namespaces and logical block addresses identified by the object definition command.

In example 13, the subject matter of example 9 may include that the object definition command indicates to the device whether successive transformations are to be applied to the object, and whether intermediate objects generated via the successive transformations are to be stored in the device for retrieval by the host.

In example 14, the subject matter of example 9 may include that the controller is further configurable to: in response to transmitting the completion command to the host, receive an indication from the host to transmit identification of locations in the device in which the one or more transformed objects are stored; and in response to receiving the indication from the host, transmit the identification of locations in the device in which the one or more transformed objects are stored.

In example 15, the subject matter of example 9 may include that integrity of the object that is received and the one or more transformed objects is maintained via an error detection and correction mechanism.

In example 16, the subject matter of example 9 may include that a location of the one or more transformed objects is transmitted in association with the completion command.

Example 17 is a system for object transformation, the system comprising: a processor; and a memory device coupled to the processor, the memory device comprising: a non-volatile memory; and a controller coupled to the non-volatile memory, wherein the controller is configurable to: transmit capabilities of the memory device for performing transformations on offloaded objects, to a host; receive, from the host, an object definition command that indicates one or more transformations to apply to an object; perform the one or more transformations on the object to generate one or more transformed objects; and transmit a completion command to the host to indicate completion of the one or more transformations on the object.

In example 18, the subject matter of example 17 may include that the controller is further configurable to: determine a location of the object, from a pointer stored in the object definition command that is received from the host, wherein the location is in the host; and copy the object from the location in the host, to a buffer of the memory device, prior to performing the one or more transformations on the object.

In example 19, the subject matter of example 17 may include the controller is further configurable to: receive the object in a buffer of the memory device, via a write operation from the host, prior to performing the one or more transformations on the object.

In example 20, the subject matter of example 17 may include that the one or more transformed objects are stored in the memory device in one or more namespaces and logical block addresses identified by the object definition command.

In example 21, the subject matter of example 17 may include that the object definition command indicates to the memory device whether successive transformations are to be applied to the object, and whether intermediate objects generated via the successive transformations are to be stored in the memory device for retrieval by the host.

In example 22, the subject matter of example 17 may include that the controller is further configurable to: in response to transmitting the completion command to the host, receive an indication from the host to transmit identification of locations in the memory device in which the one or more transformed objects are stored; and in response to receiving the indication from the host, transmit the identification of locations in the memory device in which the one or more transformed objects are stored.

In example 23, the subject matter of example 17 may include that integrity of the object that is received and the one or more transformed objects is maintained via an error detection and correction mechanism.

In example 24, the subject matter of example 17 may include that a location of the one or more transformed objects is transmitted in association with the completion command.

All optional features of any of the systems and/or apparatus and/or devices described above may also be implemented with respect to the method or process described above, and specifics in the examples may be used anywhere in one or more embodiments. Additionally, all optional features of the method or process described above may also be implemented with respect to any of the system and/or apparatus and/or devices described above, and specifics in the examples may be used anywhere in one or more embodiments.

What is claimed is:

1. A method, comprising:
    receiving, by a memory device, an object definition command from a host that indicates one or more transformations to apply to a data object;
    causing the one or more transformations on the data object at the memory device to generate one or more transformed data objects;
    storing the one or more transformed data objects in memory at the memory device, the memory associated with one or more namespaces identified in the object definition command;
    storing a completion log at a memory address at the memory device, the memory address to correspond to a log address pointer, the completion log to include completion information associated with the one or more transformations; and
    sending a completion indication to the host that includes the log address pointer to enable the host to access the completion log at the memory address to obtain completion information.

2. The method of claim 1, comprising:
    sending capabilities for performing transformations on data objects to the host prior to receiving the object definition command.

3. The method of claim 2, the capabilities comprising encryption, image processing, or deduplication.

4. The method of claim 2, the memory associated with the one or more namespaces identified in the object definition command comprises non-volatile memory.

5. The method of claim 1, the method further comprising:
    determining a location of the data object based on a pointer included in the object definition command, the location at the host;

causing the data object to be copied from the location and stored to a buffer at the memory device, prior to causing the one or more transformations on the data object.

6. The method of claim 5, comprising the buffer including volatile memory.

7. The method of claim 1, comprising:
receiving the data object in a buffer at the memory device via a write operation from the host, prior to causing the one or more transformations on the object.

8. A memory device, comprising:
a non-volatile memory; and
a controller coupled to the non-volatile memory, the controller to:
receive an object definition command from a host that indicates one or more transformations to apply to a data object and indicates an address pointer to store a completion log that includes completion information associated with the one or more transformations;
cause the one or more transformations on the data object at the memory device to generate one or more transformed data objects;
store the one or more transformed data objects in a portion of the non-volatile memory associated with one or more namespaces identified in the object definition command;
store a completion log at a memory address at the memory device, based on the memory address to correspond to a log address pointer, the completion log to include completion information associated with the one or more transformations; and
send a completion indication to the host that includes the log address pointer to cans enable the host to access the completion log at the memory address to obtain completion information.

9. The memory device of claim 8, comprising:
send capabilities to perform transformations on data objects to the host prior to receiving the object definition command.

10. The memory device of claim 9, the capabilities comprising encryption, image processing, or deduplication.

11. The memory device of claim 8, further comprising:
a buffer; and
the controller to:
determine a location of the data object based on a pointer included in the object definition command, the location at the host; and
cause the data object to be copied from the location and stored to the buffer prior to causing the one or more transformations on the data object.

12. The memory device of claim 11, comprising the buffer including volatile memory.

13. The memory device of claim 8, further comprising:
a buffer; and
the controller to:
receive the data object in the buffer via a write operation from the host, prior to causing the one or more transformations on the data object.

14. The memory device of claim 13, comprising the buffer including volatile memory.

15. A system, comprising:
a processor at a host; and
a memory device coupled to the processor, the memory device including:
a non-volatile memory; and
a controller coupled to the non-volatile memory, he controller to:
receive an object definition command from a processor that indicates one or more transformations to apply to a data object;
cause the one or more transformations on the data object at the memory device to generate one or more transformed data objects;
store the one or more transformed data objects in a portion of the non-volatile memory associated with one or more namespaces identified in the object definition command;
store a completion log at a memory address at the memory device, the memory address to correspond to a log address pointer, the completion log to include completion information associated with the one or more transformations; and
send a completion indication to the host that includes the log address pointer to enable the host to access the completion log at the memory address to obtain completion information.

16. The system of claim 15, comprising:
send capabilities to perform transformations on data objects to the processor prior to receiving the object definition command, the capabilities including encryption, image processing, or deduplication.

17. The system of claim 16, further comprising:
a buffer that includes volatile memory; and
the controller to:
determine a location of the data object based on a pointer included in the object definition command, the location at the host; and
cause the data object to be copied from the location and stored to the buffer prior to causing the one or more transformations on the data object.

18. The system of claim 17, the volatile memory comprising static random access memory.

19. The system of claim 13, further comprising:
a buffer that includes volatile memory; and
the controller to:
receive the data object in the buffer via a write operation from the processor, prior to causing the one or more transformations on the data object.

20. The system of claim 19, the volatile memory comprising static random access memory.

* * * * *

UNITED STATES PATENT AND TRADEMARK OFFICE
CERTIFICATE OF CORRECTION

PATENT NO. : 11,294,576 B2
APPLICATION NO. : 16/506628
DATED : April 5, 2022
INVENTOR(S) : Jawad B. Khan, Kelvin D. Green and Vasanthi Jagatha It is certified that error appears in the above-identified patent and that said Letters Patent is hereby corrected as shown below:

In the Claims

In Column 13, Line 11, Claim 8 should read:
A memory device, comprising:
    a non-volatile memory; and
    a controller coupled to the non-volatile memory, the controller to:
        receive an object definition command from a host that indicates one or more transformations to apply to a data object;
        cause the one or more transformations on the data object at the memory device to generate one or more transformed data objects;
        store the one or more transformed data objects in a portion of the non-volatile memory associated with one or more namespaces identified in the object definition command;
        store a completion log at a memory address at the memory device, the memory address to correspond to a log address pointer, the completion log to include completion information associated with the one or more transformations; and
        send a completion indication to the host that includes the log address pointer to enable the host to access the completion log at the memory address to obtain completion information.

In Column 14, Line 8, Claim 15 should read:
A system, comprising:
    a processor at a host; and
    a memory device coupled to the processor, the memory device including:
a non-volatile memory; and
    a controller coupled to the non-volatile memory, the controller to:
        receive an object definition command from a processor that indicates one or more transformations to apply to a data object;
        cause the one or more transformations on the data object at the memory device to generate one or more transformed data objects;

Signed and Sealed this
Eleventh Day of October, 2022

*Katherine Kelly Vidal*
*Director of the United States Patent and Trademark Office* store the one or more transformed data objects in a portion of the non-volatile memory associated with one or more namespaces identified in the object definition command;

store a completion log at a memory address at the memory device, the memory address to correspond to a log address pointer, the completion log to include completion information associated with the one or more transformations; and send a completion indication to the host that includes the log address pointer to enable the host to access the completion log at the memory address to obtain completion information.